(12) United States Patent
Scolari et al.

(10) Patent No.: US 8,857,840 B2
(45) Date of Patent: Oct. 14, 2014

(54) DRIVE SYSTEM WITH CONTOURED CAVITY

(71) Applicant: Zike, LLC, Greenville, SC (US)

(72) Inventors: Nathan A. Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 20 days.

(21) Appl. No.: 13/799,488

(22) Filed: Mar. 13, 2013

(65) Prior Publication Data

US 2014/0265215 A1 Sep. 18, 2014

(51) Int. Cl.
*B62M 1/02* (2006.01)
*B62M 1/26* (2013.01)

(52) U.S. Cl.
CPC ...................................... *B62M 1/26* (2013.01)
USPC ........... 280/256; 280/221; 280/252; 280/253; 280/257; 280/259; 280/260; 280/261; 280/87.041; 74/88; 74/45; 74/47; 74/48; 74/49; 74/50; 74/51; 74/52; 74/53; 74/54; 74/55; 74/128; 74/129; 74/126

(58) Field of Classification Search
USPC ......... 280/256, 221, 252, 253, 257, 259–261, 280/87.041; 74/88, 45, 47, 48, 49, 50, 74/53–55, 128, 129, 126
See application file for complete search history.

(56) References Cited

U.S. PATENT DOCUMENTS

| | | | |
|---|---|---|---|
| 594,980 A * | 12/1897 | Booth | 280/253 |
| 4,159,652 A * | 7/1979 | Trammell, Jr. | 74/117 |
| 5,207,442 A * | 5/1993 | Gray et al. | 280/256 |
| 7,487,987 B2 | 2/2009 | Yan | |
| 7,988,169 B2 * | 8/2011 | Baek et al. | 280/221 |
| D645,792 S | 9/2011 | Bai | |
| 8,128,111 B2 | 3/2012 | Scolarii | |
| 8,146,938 B2 * | 4/2012 | Gobillard | 280/259 |
| 8,220,813 B2 | 7/2012 | Chou | |
| 2006/0027994 A1* | 2/2006 | Misevski | 280/259 |
| 2007/0024019 A1* | 2/2007 | Tarlow et al. | 280/221 |
| 2012/0013097 A1* | 1/2012 | Fan | 280/221 |
| 2012/0145469 A1* | 6/2012 | Tong | 180/206.1 |

* cited by examiner

*Primary Examiner* — Joseph M Rocca
*Assistant Examiner* — Marlon Arce
(74) *Attorney, Agent, or Firm* — McNair Law Firm, P.A.; Douglas W. Kim

(57) ABSTRACT

The present invention is an improved drive system for a personal vehicle comprising: a frame with a steerable front wheel and rear wheel connected to a drive axle connected to a crank arm by a drive linkage; a roller rotatably attached to the crank arm; a pedal pivotally attached to the frame having a cavity for receiving the roller; a contoured wear bar carried by the cavity for contacting the perimeter of the roller; a major arch included in the contoured wear bar contacting the roller when the pedal is on a down stroke; a minor arch included in the contoured wear bar for providing additional power when the pedal is near the end of its down stroke; and, a major front slope included in the wear bar for contacting the roller when the pedal is in its upstroke to place the pedal at its highest most position.

20 Claims, 19 Drawing Sheets

45 Degrees Rotation

90 Degrees Rotation

135 Degrees Rotation

180 Degrees Rotation

270 Degrees Rotation

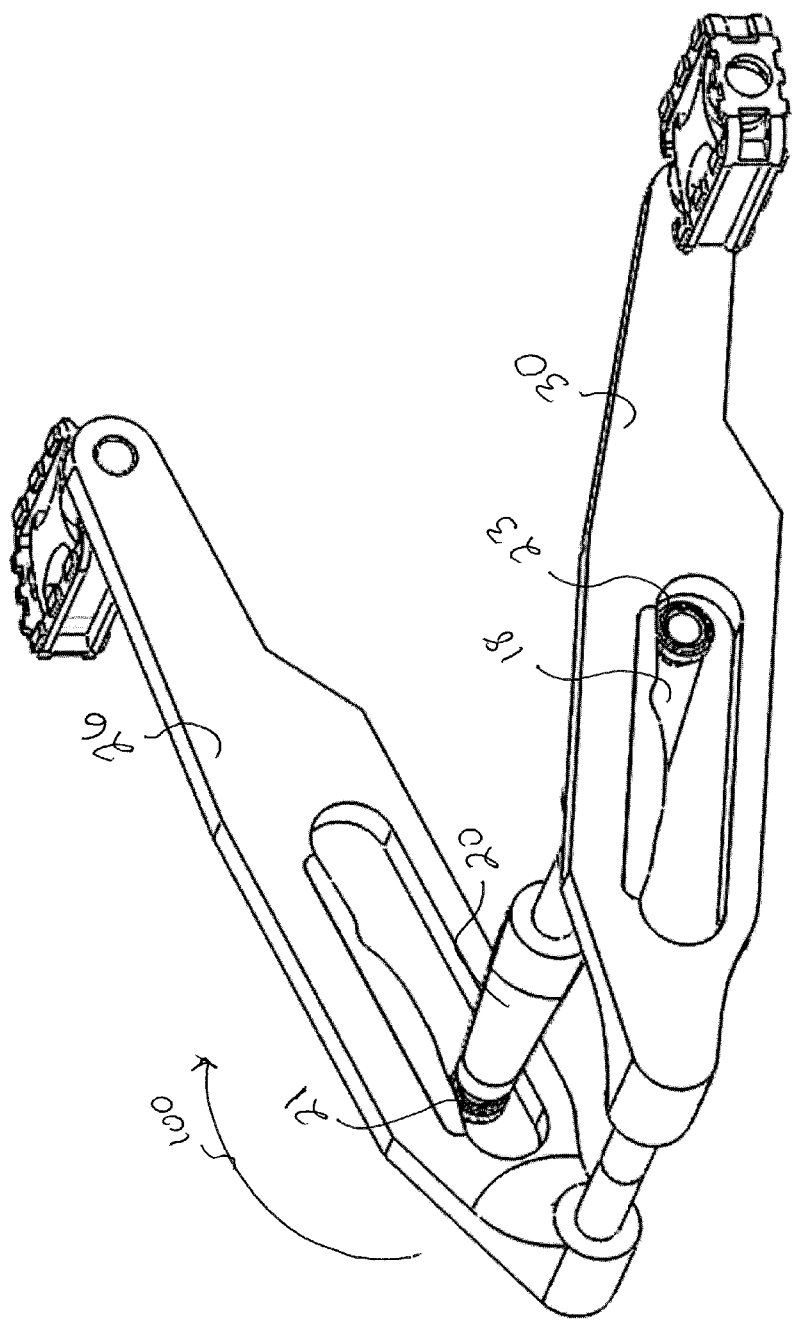

DRIVE SYSTEM WITH CONTOURED CAVITY

FIELD OF THE INVENTION

This application relates to rider propelled vehicles using a pair of reciprocating foot pedals for propulsion with a rotary drive system. More particularly to improved scooters and the drive mechanism to propel them that resist or eliminate lock up.

BACKGROUND OF THE INVENTION

A rider powered scooter as is generally understood is typically a two wheeled vehicle with a front free rolling, steerable wheel and a rear free rolling, non-steerable wheel connected to each other by a frame including a rider platform positioned between the wheels on which the rider can support himself. To move, the rider can roll or coast downhill and on level or elevated ground can use one foot to push off the ground as the other foot rests on the platform. This locomotion process was employed at the inception of the scooter and skateboard.

To start rolling, the rider often runs alongside the scooter to reach a certain speed and then jumps onto the platform to ride using the one foot push method to maintain motion. These simple coaster type scooters gained popularity among young riders as they were generally easy to ride and required less skill to ride than a skateboard device which has no true steering mechanism other than weight shifting which required rider skill, balance and agility to steer the device. Both the scooter and the skateboard's use of generally small wheels permits the platforms to be very low relative to the ground. Having the platform low to the ground improves the stability of these free rolling scooters.

Typically, scooters have no easy way to maintain speed and are somewhat limited in performance. Skateboards, however, can be used in a variety of exciting ways including jumps and wheelies and other tricks. One result from these design differences is that coaster scooters are more limited. When the excitement of the initial purchase wanes, the child becomes bored or tired of the device. The scooter simply was not as much fun as a skateboard. Further, the scooter could not compete with a bicycle in terms of performance, so the device was relegated to a fad which, over time, may lose children's interest.

Attempts to improve on the scooters appeal, several devices suggested adding one or two pedals to help propel the scooter such as the one described in U.S. Pat. No. 7,487,987. One such three wheeled device called Pumgo® was made, marketed and sold; but this device is slow, difficult to turn without tipping and hard to maintain balance. It provides limited entertainment and is not a practical transportation device.

The three wheeled device was not readily accepted as its performance was sub-standard. Therefore, there is a need for a self-powered scooter that allows for the maneuverability of the two wheels in a linear configuration while providing sufficient forward propulsion and speed that cannot be achieved by simply pushing along the ground. After prolonged research, experimental prototypes, and evaluations the development of the original concept of the self-propelled scooter has been markedly improved with technical features and changes heretofore neither appreciated nor recognized. The following description provides this latest improvement over the original basic design concept and makes this improved scooter far more reliable with superior propulsion performance and better rider stability than was previously possible.

It is also desirable to have a rotary motion from a crank arm that rotates an axle for providing the driving force in propelling the scooter. However, it is also advantageous to have pedal wings that increase the amount of leverage that can be applied for propulsion such as with stepper devices such as in U.S. Pat. No. 8,128,111 owned by the Applicant. It is also desirable to have a winged pedal system that can be retrofit to existing rotary pedal systems to improve the speed and performance of the traditional rotary pedal drive systems.

One disadvantage of the wing pedal system is that when one of the wing pedals is in the upmost position and the user is attempting to start locomotion, the wing pedal can lock or counter-rotate thereby forcing the rider to reset the pedal and restart the scooter. This lockup is principally caused by the interaction with the crank arm, whether it is at or past its upmost position and whether the crank arm rotates in proper direction.

Therefore, it is an object of the present invention to provide a wing pedal drive system that uses the rotary motion of crank arms to provide propulsion.

It is another object of the present invention to provide a wing pedal system using a rotary drive system that reduces or eliminates the lock up when starting locomotion.

It is another object of the present invention to provide for a wing pedal drive system that can be retrofit to existing rotary drive systems.

SUMMARY OF THE INVENTION

The above objectives are accomplished by providing an improved drive system for a personal vehicle comprising: a frame having a steerable front wheel and a rear wheel connected to a drive axle; a crank arm connected to said drive axle by a drive linkage so that when said crank arm rotates, said drive axle causes said rear wheel to rotate thereby providing locomotion; a roller rotatably attached to said crank arm; a pedal pivotally attached to said frame having a cavity for receiving said roller; a contoured wear bar carried by an upper surface of said cavity for contacting the perimeter of said roller; a major arch included in said contoured wear bar contacting said roller when said pedal in on a down stroke; a minor arch included in said contoured wear bar for providing additional power when said pedal is near the end of its down stroke; and, a major front slope included in said wear bar for contacting said roller when said pedal is in its upstroke to place the pedal at its highest most position.

The length of said major arch can be about twice the length of said minor arch. There can be a concave area between said major arch and said minor arch. The contoured wear bar can be removably attached to said upper surface of said cavity. The vehicle can be a non-motorized scooter. The minor arch can contact the roller forcing said crank arm in a position greater than 180 degrees past horizontal when said crank arm is in the downward position at the end of the downward stroke. This functionality assists in allowing the rider to increase the forward motion of the vehicle. The pedal can be rotatably attached to said frame forward of said drive axle.

In one embodiment, the vehicle can include a frame, front wheel, rear wheel, pedal, drive axle, drive linkage attaching said drive axle to said rear wheel, and crank arm attached to said drive axle. The improvement can be attached to the existing vehicle and comprise: a roller attached to said crank arm; a cavity defined in said pedal; a major arch defined in said cavity assisting in preventing said crank arm from counter-rotating; and, a minor arch defined in said cavity disposed rearward of said major arch.

DESCRIPTION OF THE DRAWINGS

The invention will be better understood with reference to the following drawings that are part of this specification:

FIG. 10A through 10H are perceptive view of the invention at various position in operations as it rotates.

DESCRIPTION OF THE INVENTION

Figure 1:
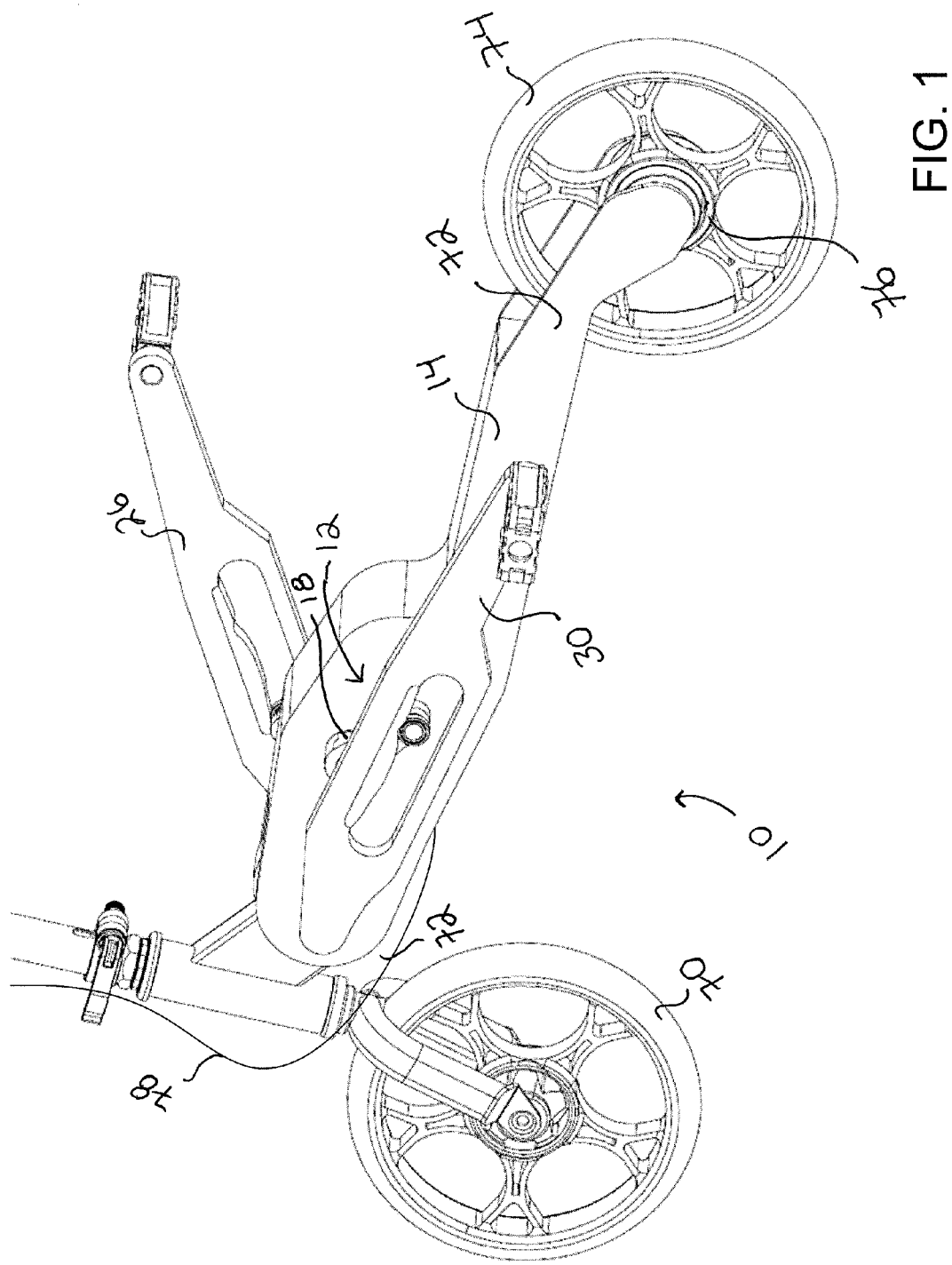
FIG. 1 is a perspective view of the invention.

Referring to FIG. 1, scooter 10 is shown with a drive system 12 internal to a housing 14 which includes an drive axle 16 which extends through the housing from one side to the other. A front wheel 70 is attached to a frame and can be steerable. A rear wheel 74 is also attached to the frame and can include a braking assembly 76 connected by brake cable 78 to a braking actuator (not shown). A drive linkage connects a drive axle 16 to the rear wheel so that when the drive axle rotates, the rear wheel turns producing locomotion. In one embodiment, the drive linkage is a chain. In one embodiment, the drive linkage is a plurality of interconnecting gears.

Figure 2:
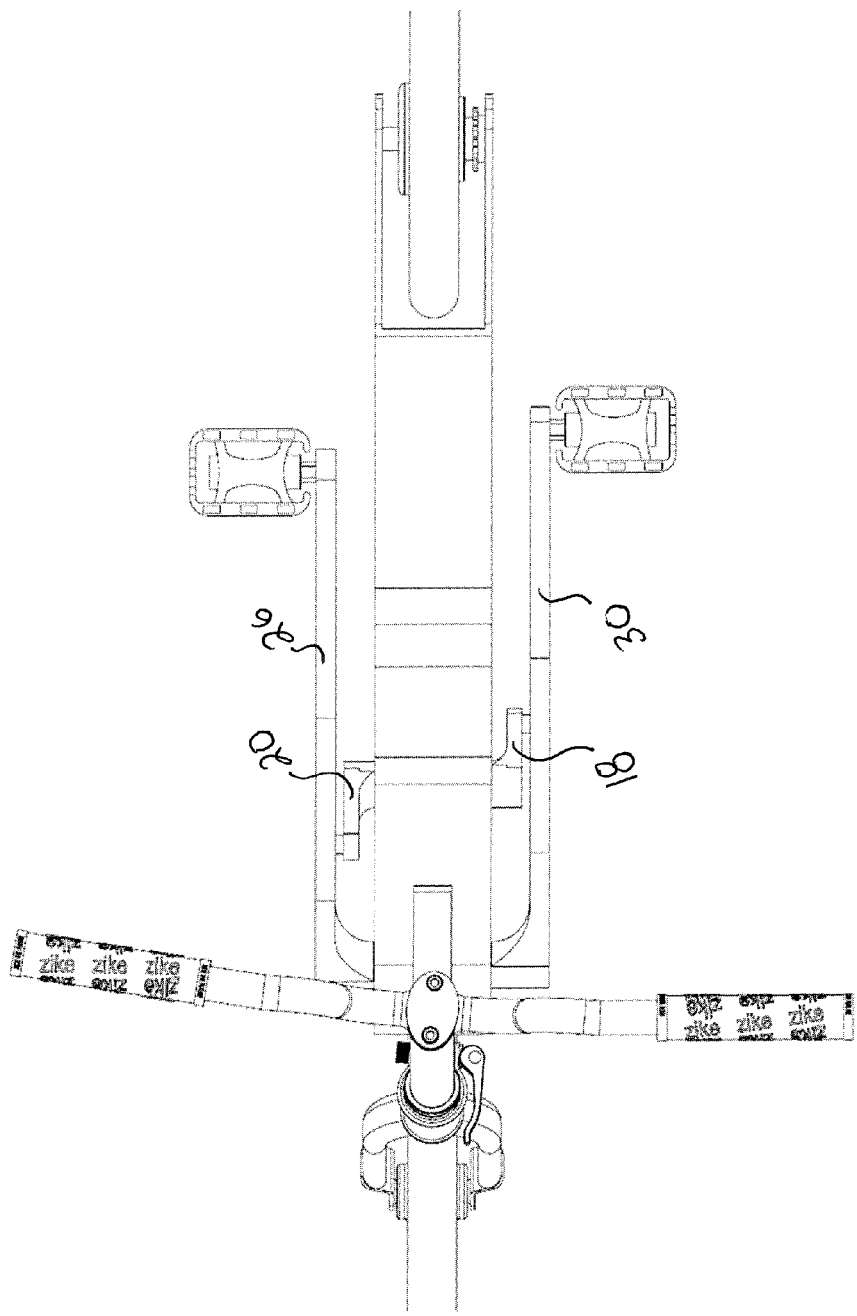
FIG. 2 is a top view of the invention.

A left crank arm 18 (FIG. 2) is attached to the axle so that when the crank arm rotates, the drive axle rotates. A right crank arm 20 is attached to the opposite side of the axle and offset 180 degrees from the left crank arm. When the right crank arm rotates the drive axle, the left crank arm is also rotated.

Figure 3:
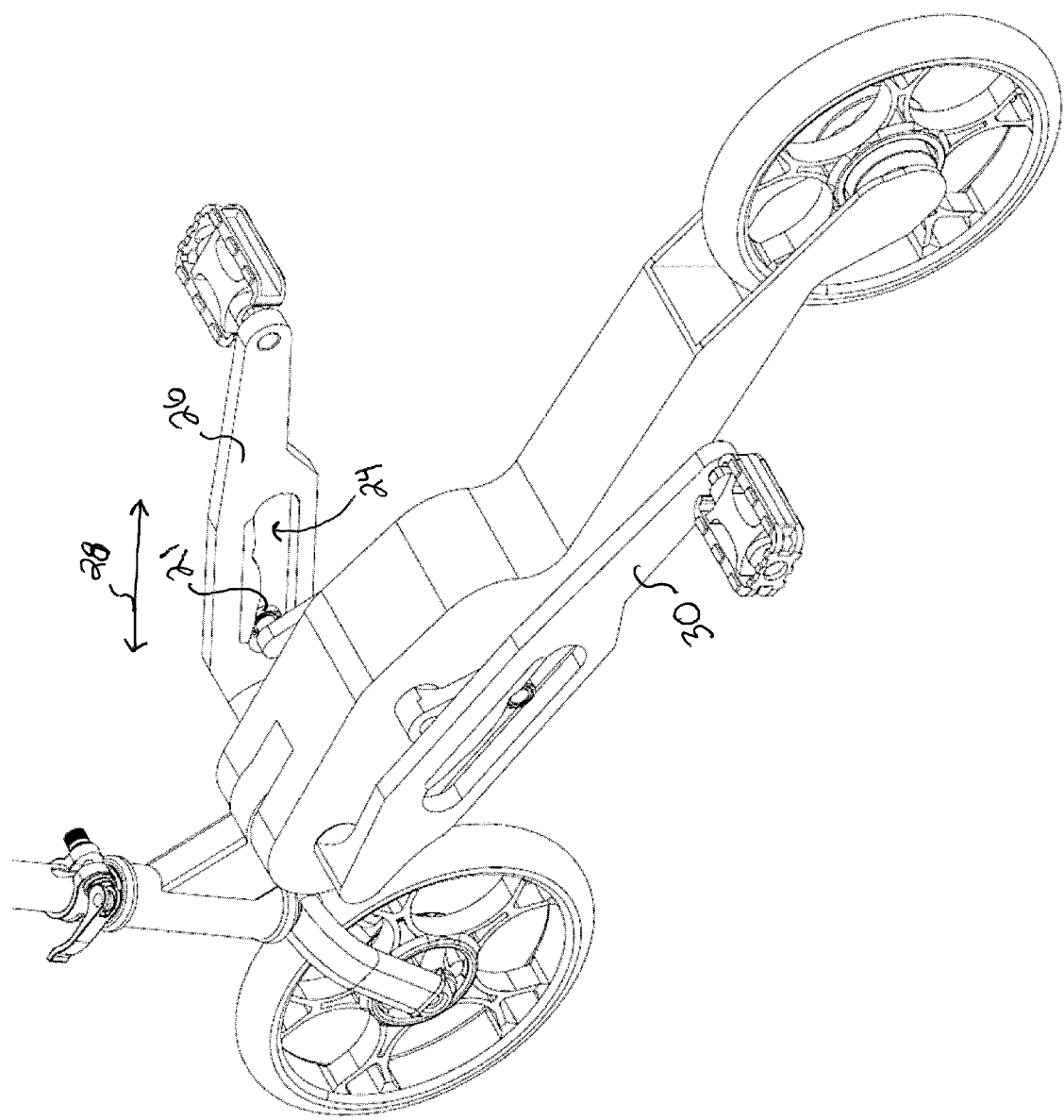
FIG. 3 is a perspective view of the invention.

Referring to FIG. 3, a right roller 21 is attached to the right crank arm with a rotational axis parallel to the rotational axis of the drive axle. The right roller is received in a pedal cavity 24 defined in the right wing pedal 26. As the right crank arm rotates in a circular direction, the roller generally travels in a linear fashion relative to the cavity in the right wing pedal shown generally as 28. A left roller 23 is attached to the left crank arm and is received in left pedal cavity of left pedal 30 (FIG. 1). In one embodiment, the crank arms terminate in the pedal cavities with posts rather than rollers. In one embodiment, the crank arm is attached to a contact member that is received in the pedal cavity. In one embodiment, the contact member is a roller.

Figure 4:
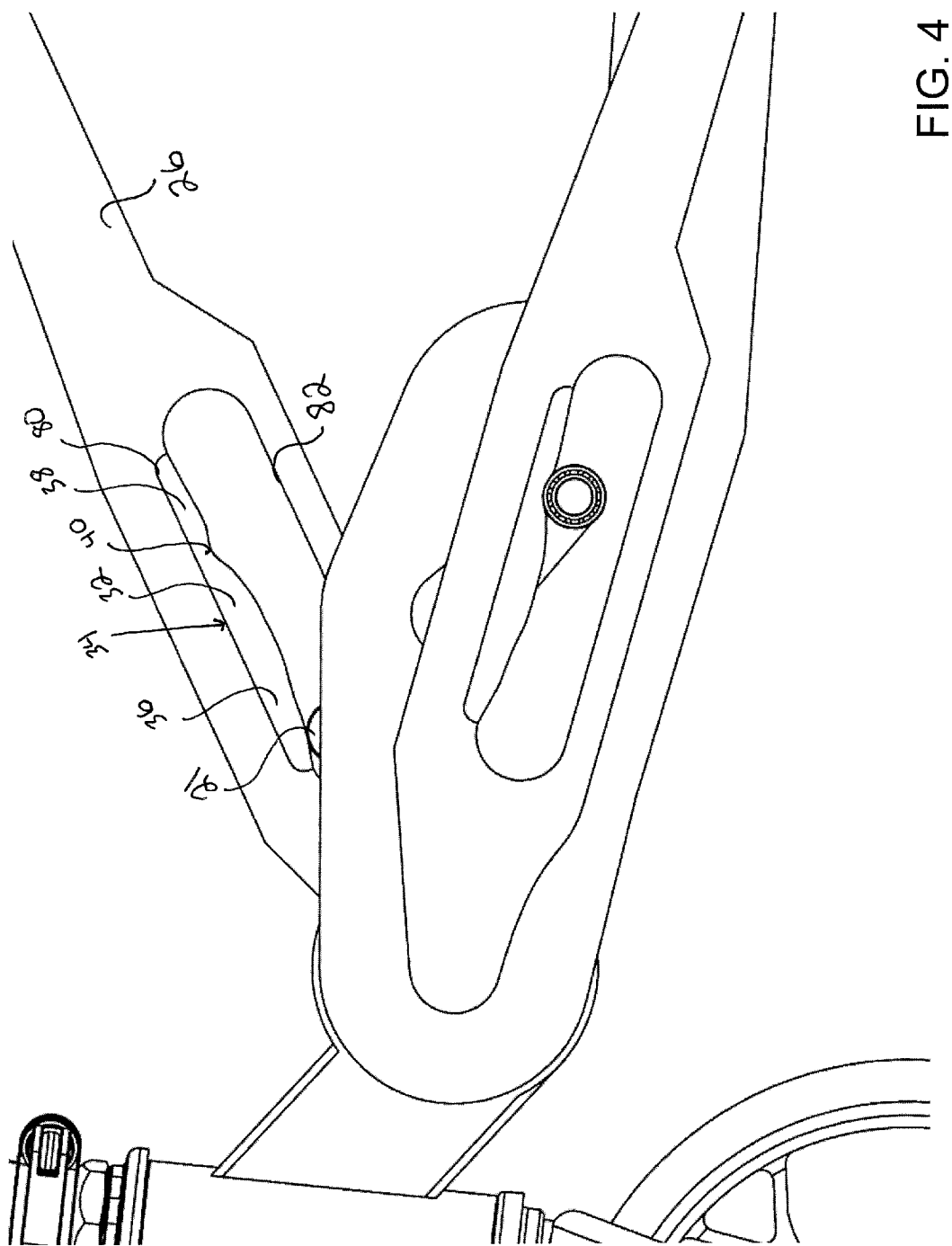
FIG. 4 is a perspective view of the invention.

Referring to FIG. 4, the pedal cavity includes a wear bar 32. The wear bar is disposed in the wear bar cavity 34 defined in the pedal cavity. The cavity can include an upper surface 80 and lower surface 82. In one embodiment, the wear bar is removably attached to the upper surface of the right pedal. The wear bar can include a major arch 36 and a minor arch 38. A concave area 40 can be included the wear bar. In one embodiment, the length of the major axis can be about twice that of the length of the minor axis.

Figure 5:
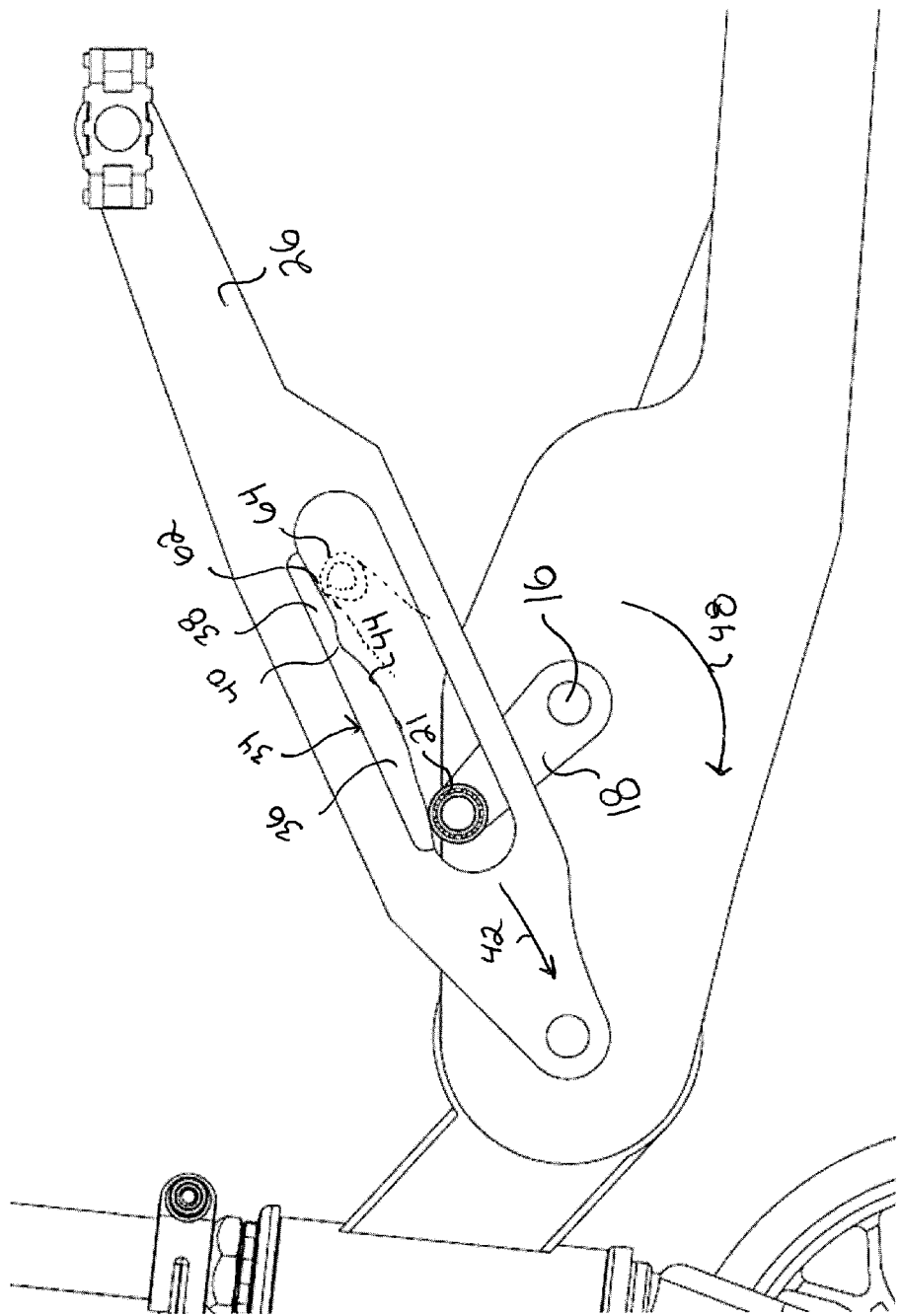
FIG. 5 is a side view of the invention.

Referring to FIG. 5, the operation of the invention is shown. The right pedal and right crank arm are shown in their highest positions. It is at this point that the rider would shift the rider's weight from the left to the right pedal to continue locomotion. As this force is directed downward, the roller is placed against rear major slope 44 and forced in a direction opposite 42 thereby preventing the crank arm from counter-rotating.

Figure 6:
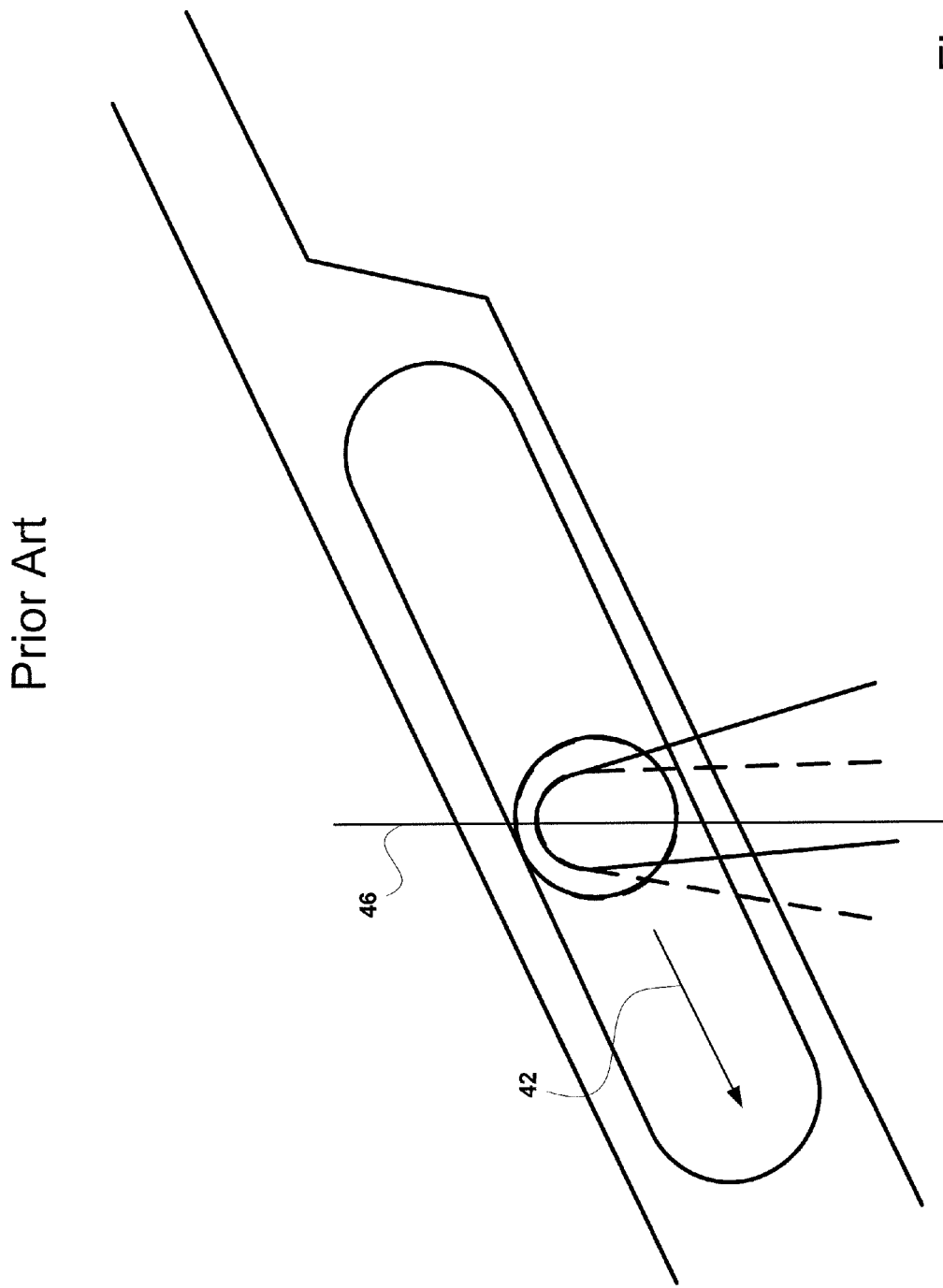
FIG. 6 is a side view of the prior art.

Were the crank arm allowed to counter-rotate, the drive system will lock-up requiring the rider to push the vehicle a small distance to cause the crank arm to rotate so that it is in a position past 180 degrees from vertical. This lock-up occurred in typical configurations as shown in prior art FIG. 6, where the cavity does not include a contoured wear bar, the roller could be caused to travel in a direction shown as 42 which would be counter rotation causing a lock-up. In this configuration, the crank arm would have to be rotated past the 180 degree vertical position 46 to prevent the lock-up. This manual moving of the crank arm in the present invention becomes unnecessary.

Figure 7:
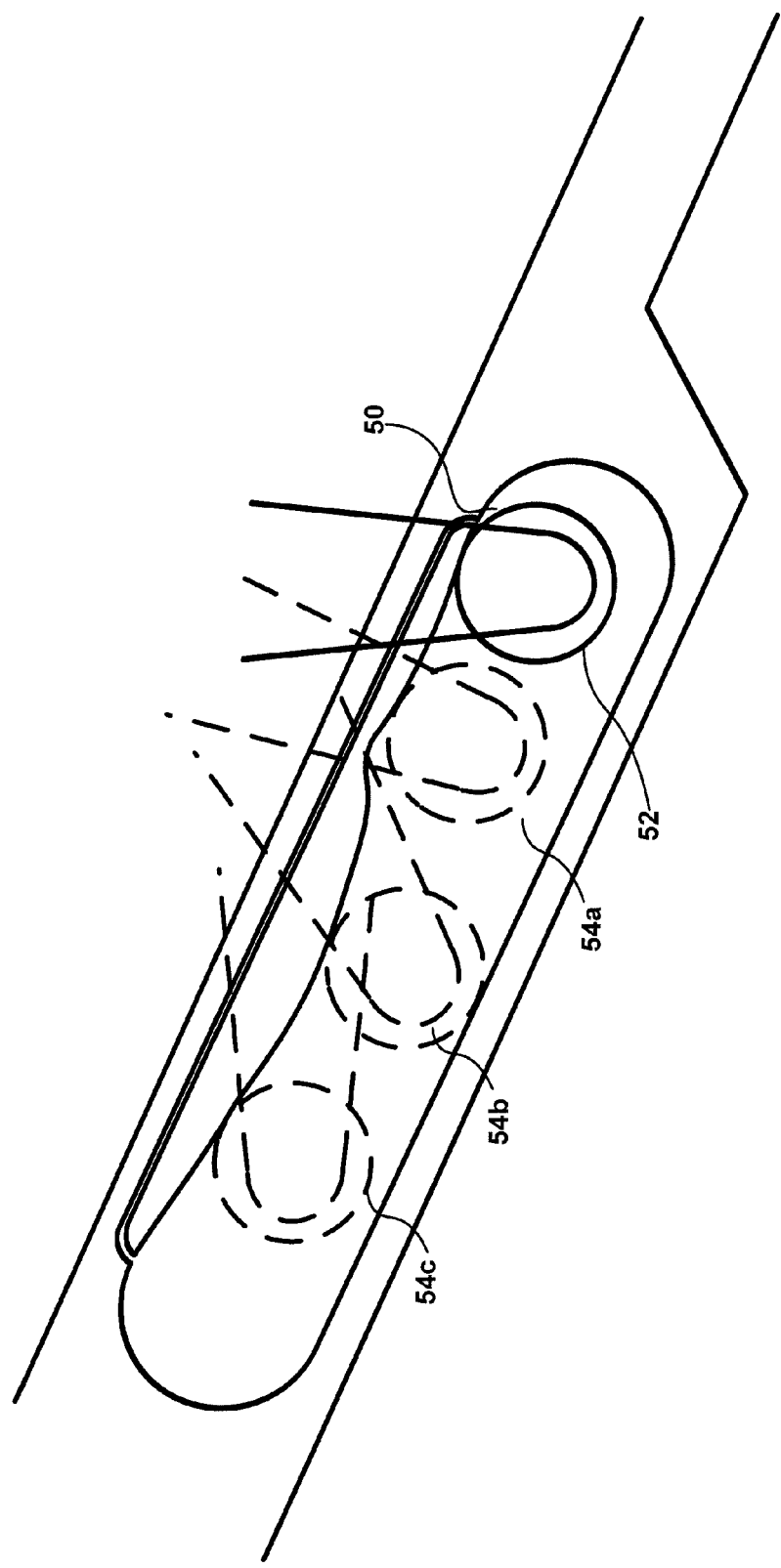
FIG. 7 is a side view of the invention.
Figure 8:
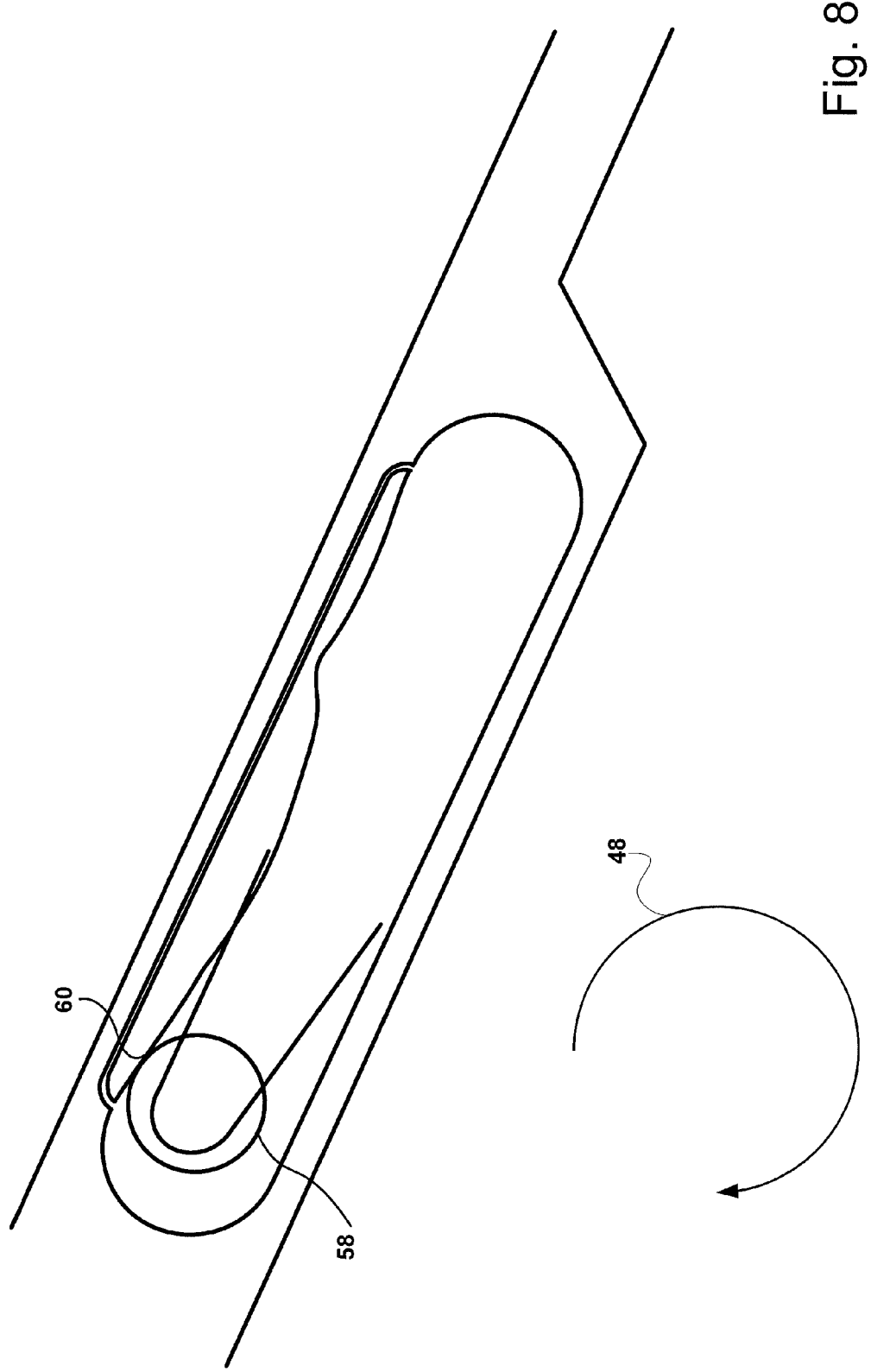
FIG. 8 is a side view of the invention.
Figure 9:
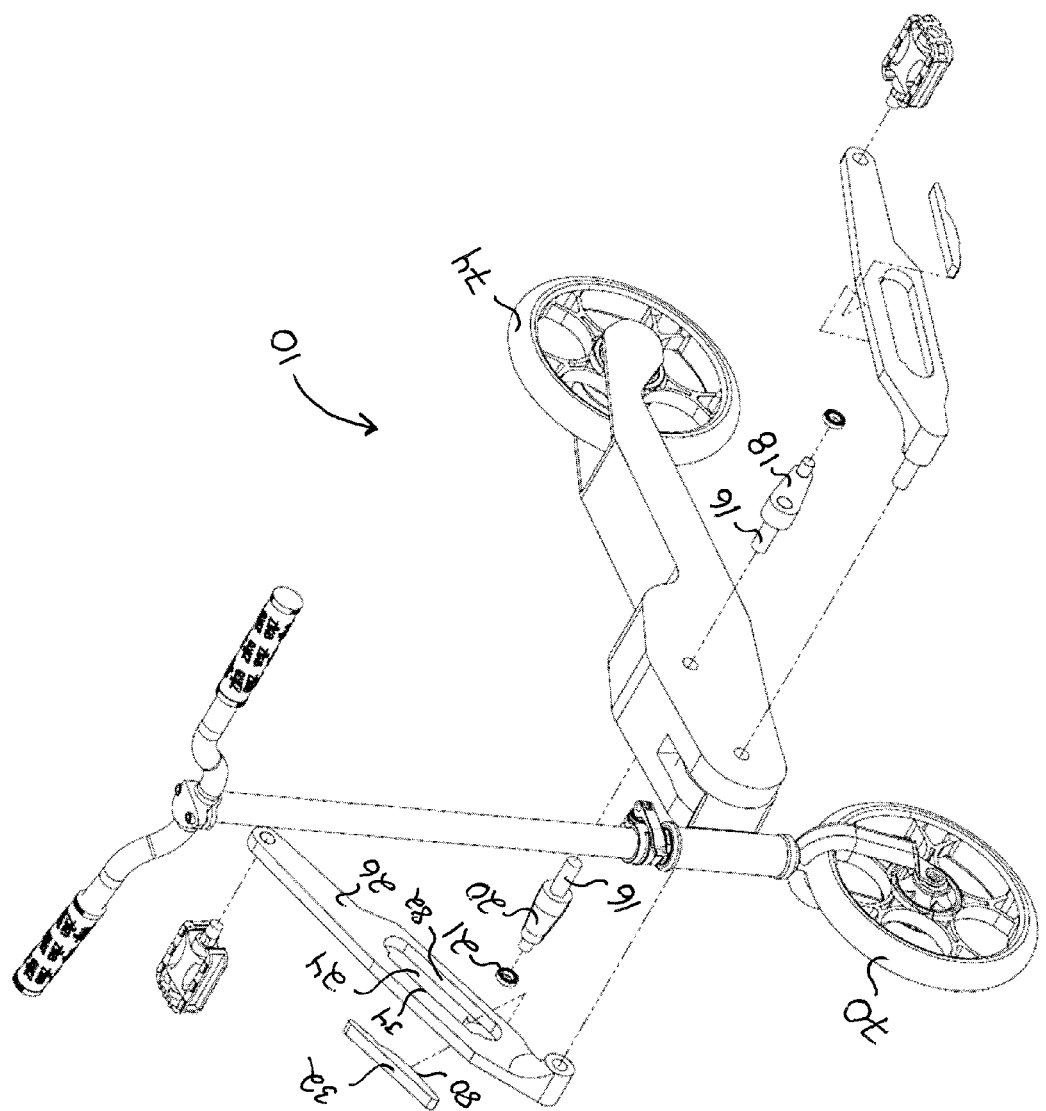
FIG. 9 is a perspective exploded view of components of the invention.
Figure 10A:
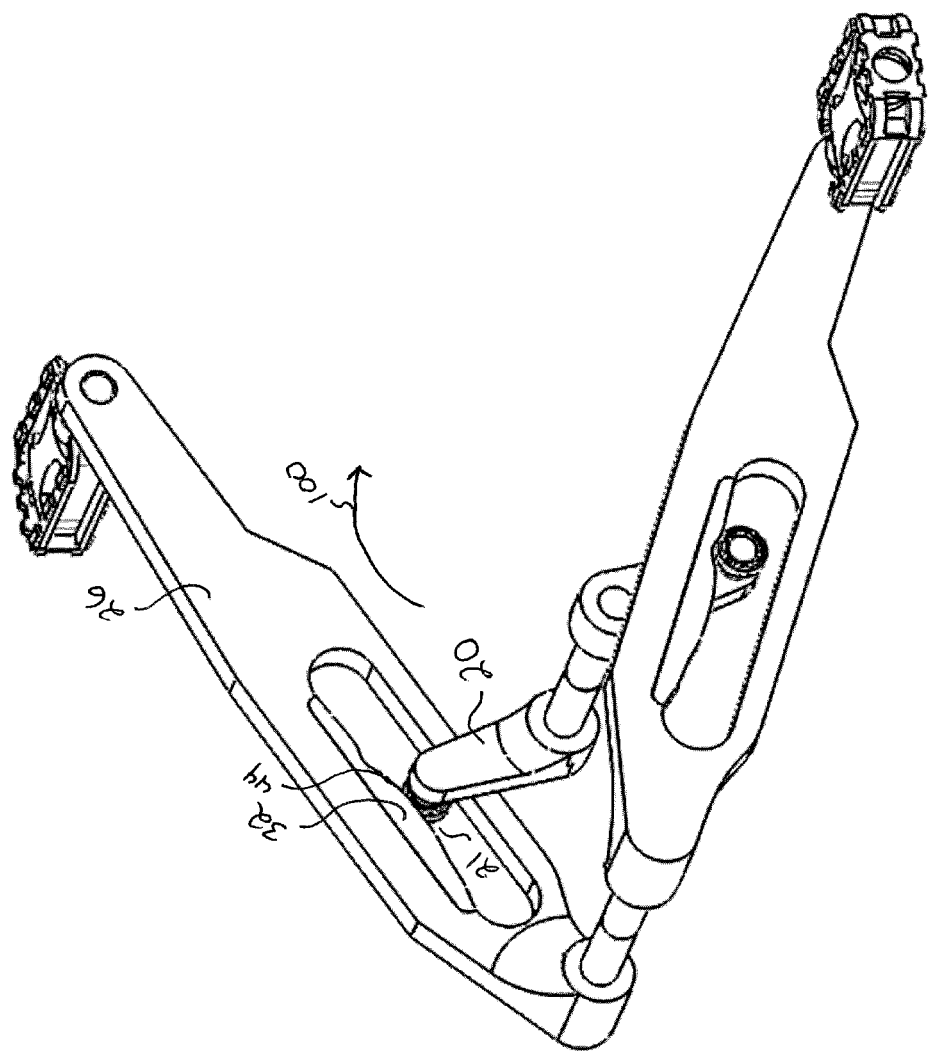
Figure 10B:
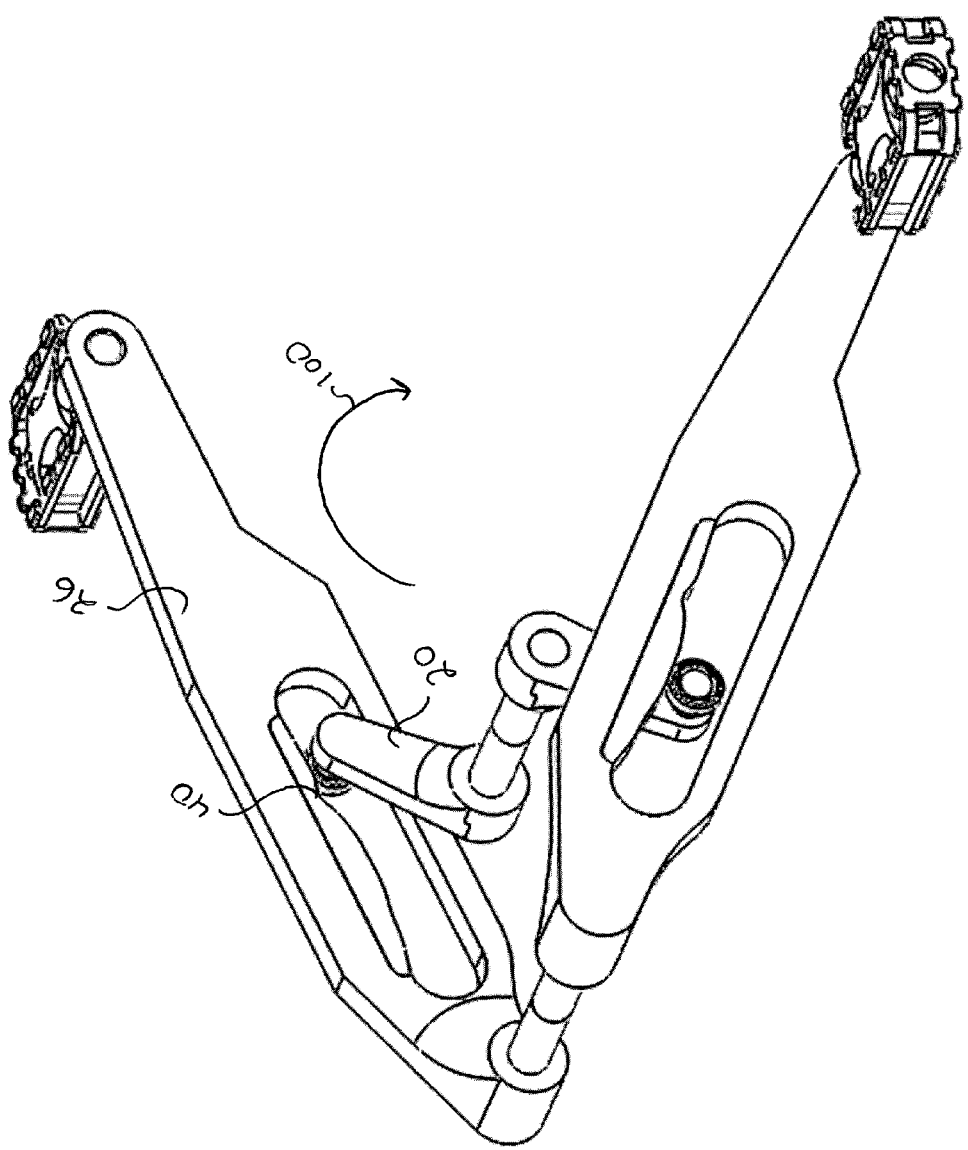
Figure 10C:
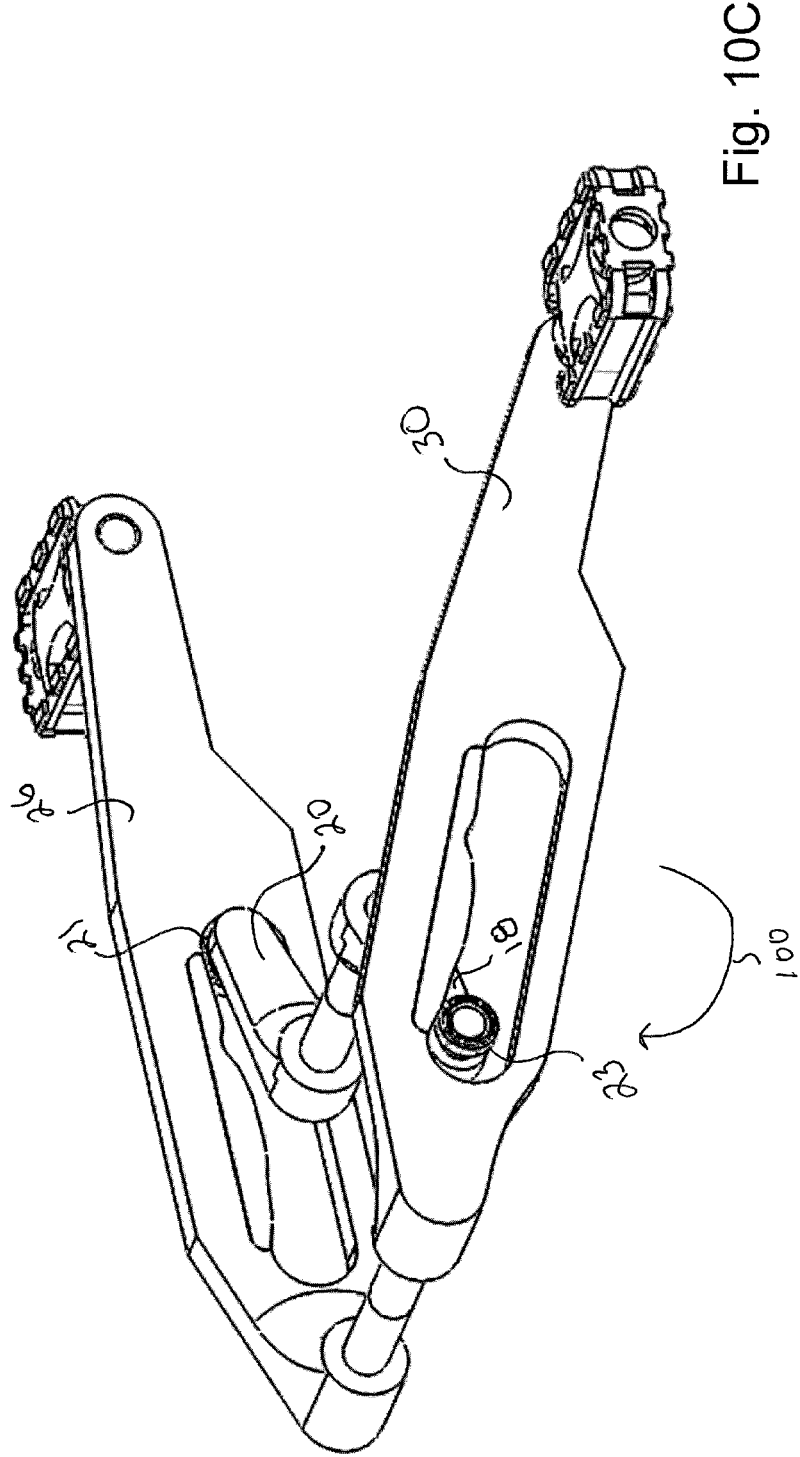
Figure 10D:
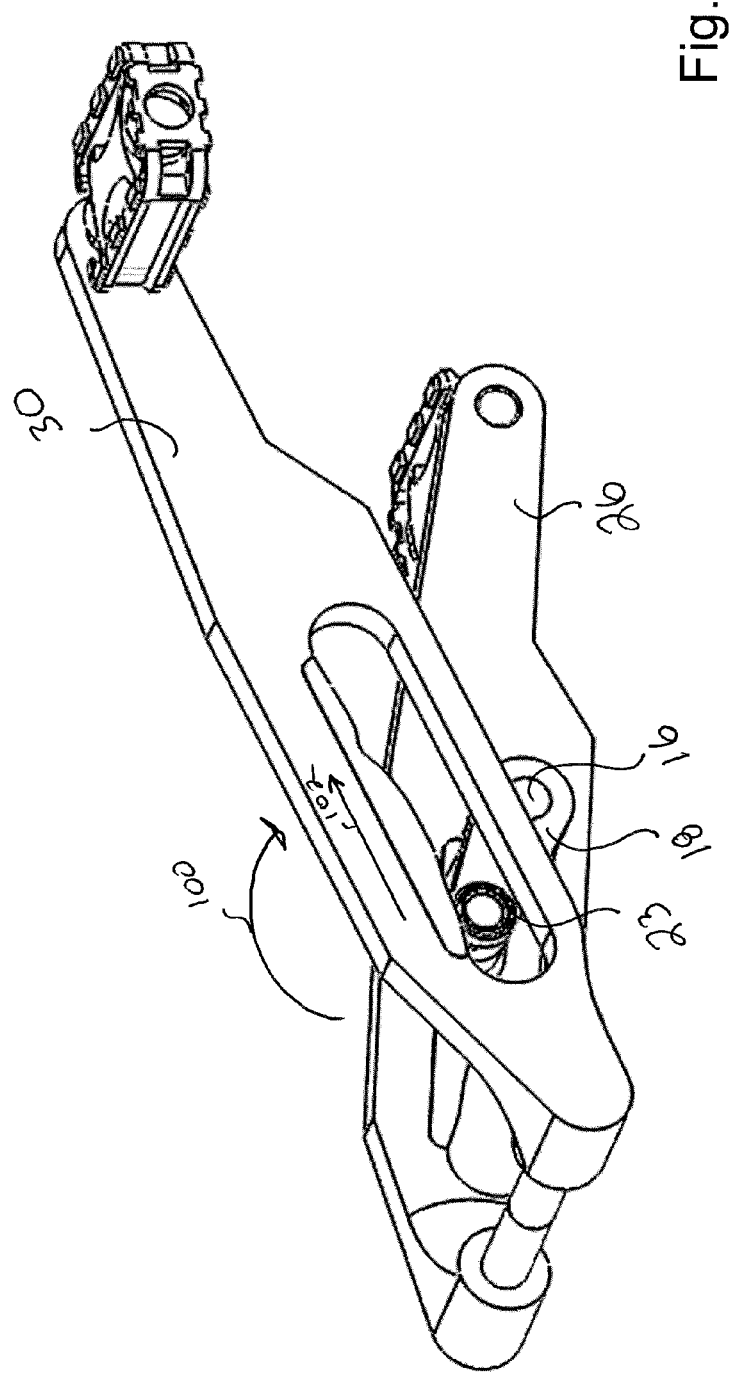
Figure 10E:
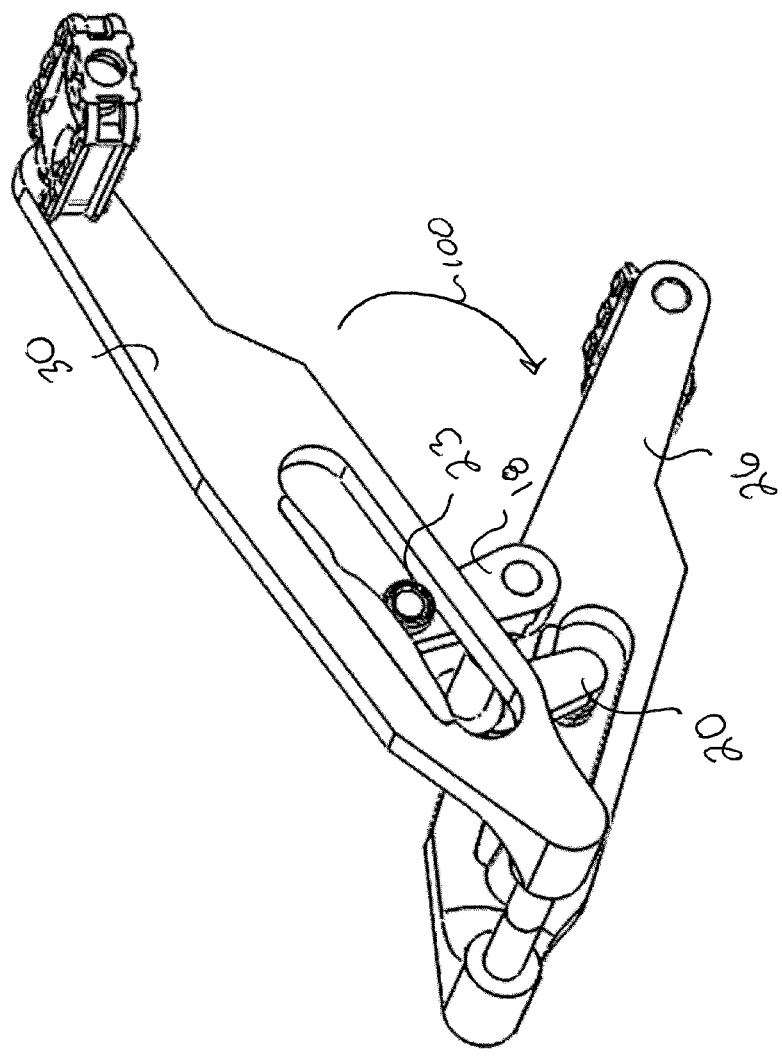
Figure 10F:
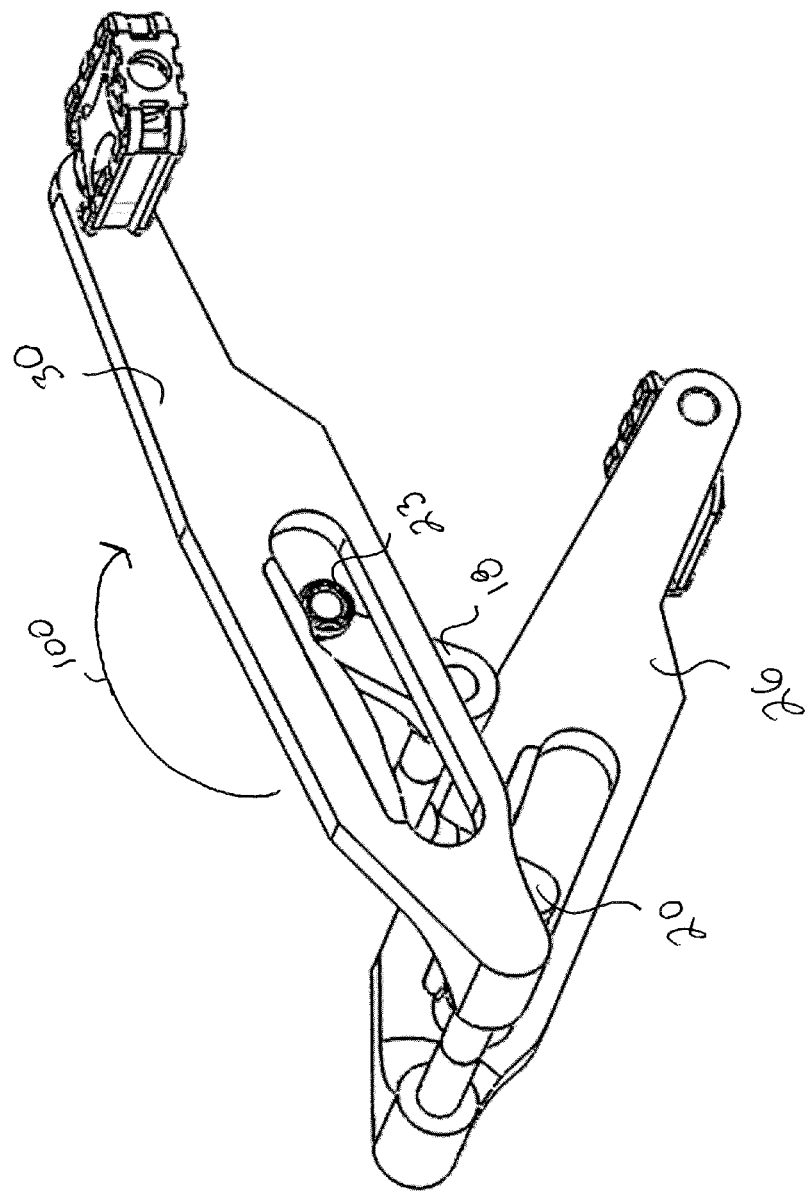
Figure 10G:
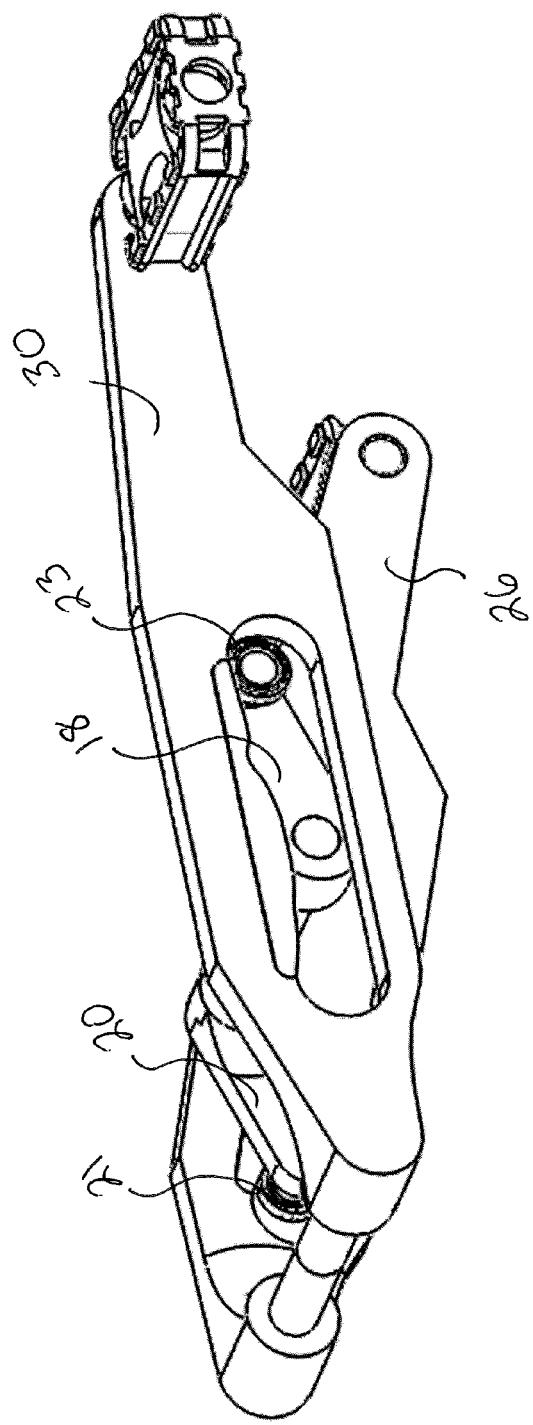
Figure 11:
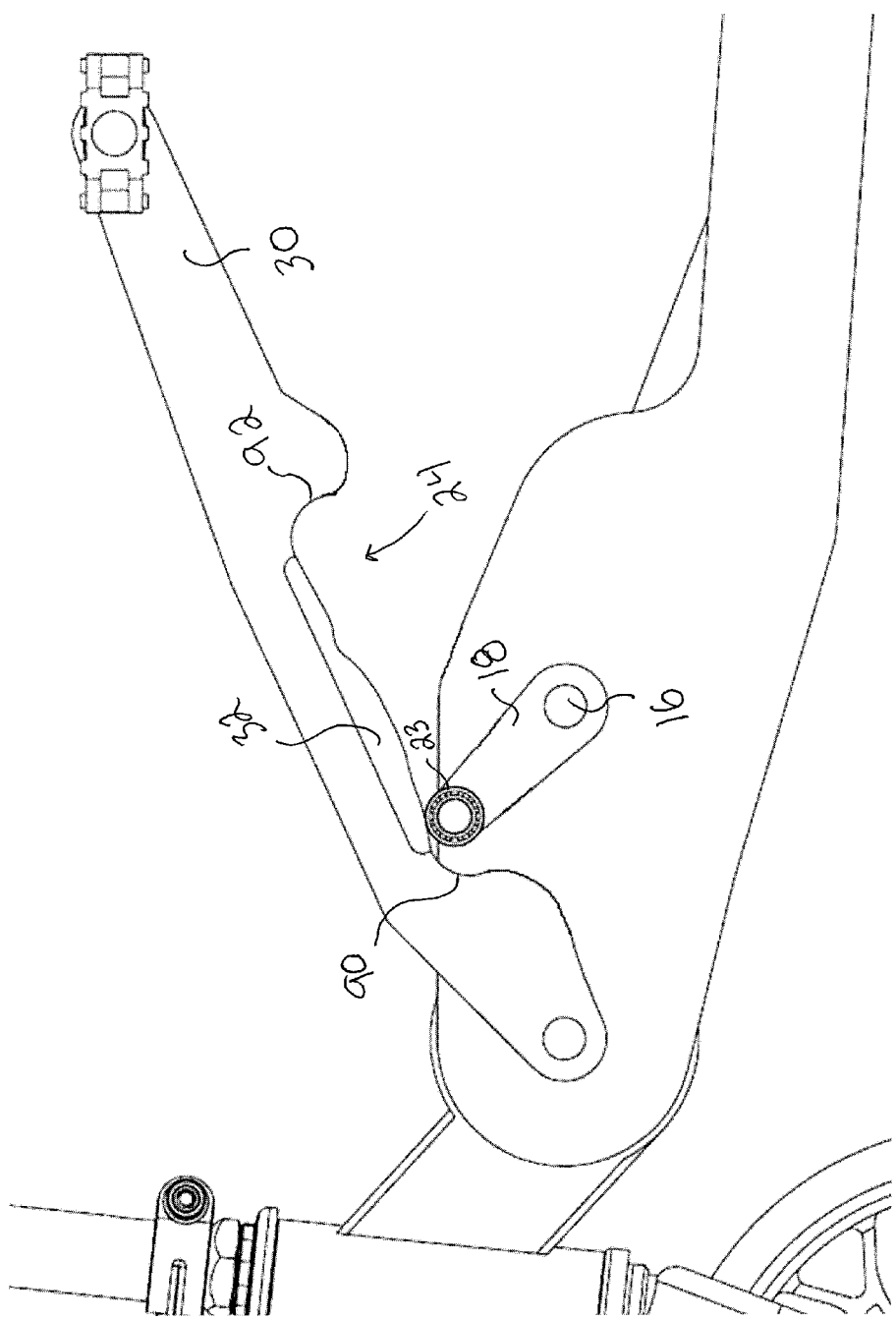
FIG. 11 is a side view of one embodiment of the present invention; and,
FIG. 12 is a side view of one embodiment of the present invention.

Referring to FIG. 7, as force is applied to the pedal, the contoured wear bar contacts the roller and forces the roller downward thereby forcing the crank arm in rotational direction shown as 48 (FIG. 8). The rider pushes the pedal downwards to its lowest most point. At this point, the left pedal is at its highest point and the rider shifts the rider's weight to the left side pedal. At this point the left contoured wear bar is forced against left roller and causes the right crank arm and right roller to rotate thereby causes the right roller to contact the wear bar and for the right pedal upwards. As the left pedal continues to be depressed, the right roller continues along its wear bar as shown 54a through 54c until the right crank is positioned approximately horizontal in relation to the ground. At position 58 the roller contact the wear bar at the front major slope 60 as shown in FIG. 8 and begin to raise the pedal upwards. As the crank rotates in a direction 48, the roller is forced against the wear bar and causes the right pedal to rise. Once the right pedal reaches its upmost position, the rider shifts their weight from the left pedal to the right pedal and the process repeats.

Referring to FIG. 5, the minor arch includes a rear slope 62 so that when the pedal is nearing the end of the down stroke and the right crank arm is in a position shown as 64 and prior to when the rider shifts their weight from the right pedal to the left pedal, force applied to the right pedal causes the roller to contact the minor rear slope resulting in additional rotational force being applied to the drive axle assisting the left crank arm to rotate to the upmost upright position and further assisting in preventing lock-up.

In one embodiment, the wear bar is 6 inches long, the major arch is ¼ inches high and the minor arch is ⅛ inches high. The major arch itself is about 4 inches in length. The roller has a diameter of ⅞ inches. The crank arms are about 2 inches in length and travel along a travel path of about 4 inches. In one embodiment, the wear bar is removable and attached in a recess 46 in the cavity.

Figure 12:
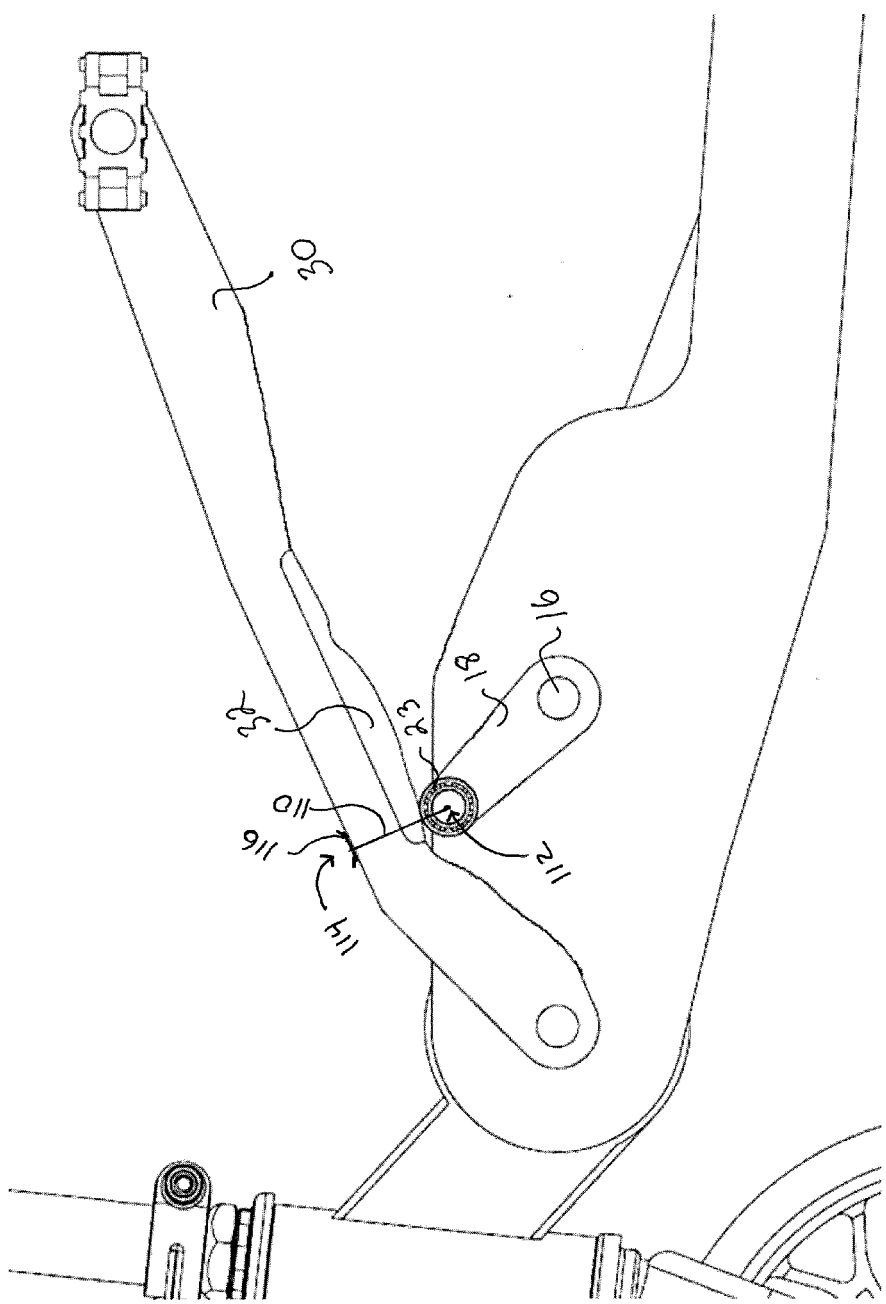

Referring to FIG. 12, the pedal can rotate upwards and away from the roller so that the wear bar is not contacting the roller. In one embodiment, a pin 110 is attached to the crank arm having an attachment end 112 and a distal end 114. The distal end can contact the upper side of the pedal arm and secure the roller to the wear bar preventing the pedal from rotating upward and away from the roller. In one embodiment, the distal include a slide member 116 which slides along the upper surface of the pedal. In one embodiment, the slide member is a roller. The pin can be rotatable attached to the axis of the roller on the crank arm.

One embodiment of the invention as described herein is directed to a scooter. As used herein, a scooter is a vehicle having typically two wheels, but could have three, and is so designed to have the rider standing on the pedals. The use of pneumatic tires, solid rubber or urethane tires does not change the device from a scooter to a bicycle. It is understood, however, the present invention, with the addition of a seat for the rider, would take on the appearance of a pedal drive bicycle. As such, the use of the present invention with a seat would also be considered within the scope of the present invention, but it must be appreciated that the maximum driving speed of the rear wheel is most easily performed standing. The vehicle can be motorized or non-motorized Variations in the present invention are possible in light of the description provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved drive system for a personal vehicle comprising:
    a frame having a steerable front wheel and a rear wheel connected to a drive axle;
    a crank arm connected to said drive axle by a drive linkage so that when said crank arm rotates, said drive axle causes said rear wheel to rotate thereby providing locomotion;
    a roller rotatably attached to said crank arm;
    a pedal pivotally attached to said frame having a cavity for receiving said roller;
    a contoured wear bar carried by an upper surface of said cavity for contacting the perimeter of said roller;
    a major arch included in said contoured wear bar contacting said roller when said pedal is on a down stroke; and,
    a major front slope included in said wear bar for contacting said roller when said pedal is in its upstroke to place the pedal at its highest most position.

2. The drive system of claim 1 wherein said length of said major arch is about twice the length of a minor arch included in the wear bar.

3. The drive assembly of claim 2 including a concave area between said major arch and said minor arch.

4. The drive system of claim 1 wherein said contoured wear bar is removably attached to said upper surface of said cavity.

5. The drive assembly of claim 1 wherein said personal vehicle is a non-motorized scooter.

6. The drive assembly of claim 1 wherein said minor arch contacts said roller forcing said crank arm in a position greater than 180 degrees past horizontal when said crank arm is in the downward position at the end of the downward stroke.

7. The drive assembly of claim 1 wherein said pedal is rotatably attached to said frame forward of said drive axle.

8. An improved drive system for a personal vehicle having a frame, front wheel, rear wheel, drive axle, drive linkage attaching said drive axle to said rear wheel, and crank arm attached to said drive axle comprising:
    a crank arm having a contact member;
    a cavity defined in said pedal for receiving said contact member; and,
    a major arch defined in said cavity assisting in preventing said crank arm from counter-rotating; and
    a minor arch defined in said cavity disposed adjacent to said major arch wherein said major arch is forward said minor arch.

9. The drive system of claim 8 wherein said contact member is a roller.

10. The drive system of claim 8 wherein said major arch and said minor arch are defined in a wear bar attached to an upper surface of said cavity.

11. The drive system of claim 10 wherein said wear bar is removably attached to said upper surface of said cavity.

12. The drive assembly of claim 8 wherein said pedal is pivotally attached to said frame forward of said drive axle.

13. The drive assembly of claim 12 wherein said roller moves rearward in relation to said frame during a down stroke and forward relative to the frame along said minor arch during the end of said down stroke.

14. The drive assembly of claim 8 wherein said roller contacts a front slope of said major arch when said pedal is on its upstroke causing said pedal to move in an upward direction.

15. A drive system for a vehicle having a frame, drive axle, crank arm attached to the drive axle and a drive linkage connecting the drive axle to a wheel so that the wheel rotates when the drive axle rotates comprising:
    a pedal pivotally attached to the frame forward said drive axle;
    a cavity defined in said pedal having a major arch and a minor arch;
    a roller attached to a distal end of the crank arm wherein said roller is received in said cavity; and,
    whereas when a downward force is applied to said pedal when said pedal is in its upward most position, said roller contacts said major arch causing said crank arm to rotate while assisting in preventing the crank arm from counter rotating.

16. The drive system of claim 15 wherein said major arch and said minor arch are defined in a contoured wear bar attached to an upper surface of said cavity.

17. The drive system of claim 16 wherein said wear bar including inserting a contoured wear bar is removably attached to said upper surface of said cavity.

18. The drive system of claim 15 wherein said vehicle is a non-motorized scooter.

19. The drive system of claim 15 including:
    left and right pedals having a left and right cavity;
    left and right rollers attached to left and right crank arms respectively; and,
    wherein said left and right crank arms are offset 180 degrees.

20. The drive system of claim 15 including a pin securing the pedal to the crank arm.

* * * * *